(12) United States Patent
New (10) Patent No.: US 8,572,153 B1
(45) Date of Patent: Oct. 29, 2013

(54) MULTIPLIER CIRCUIT CONFIGURABLE FOR REAL OR COMPLEX OPERATION

(75) Inventor: Bernard J. New, Carmel Valley, CA (US)

(73) Assignee: Xilinx, Inc., San Jose, CA (US)

( * ) Notice: Subject to any disclaimer, the term of this patent is extended or adjusted under 35 U.S.C. 154(b) by 2087 days.

(21) Appl. No.: 11/016,426

(22) Filed: Dec. 16, 2004

(51) Int. Cl.
*G06F 7/52* (2006.01)

(52) U.S. Cl.
USPC .......................................... 708/620; 708/622

(58) Field of Classification Search
USPC .................................................. 708/620, 622
See application file for complete search history.

(56) References Cited

U.S. PATENT DOCUMENTS

| 5,777,915 | A | * | 7/1998 | Witte et al. | 708/620 |
| 6,411,979 | B1 | * | 6/2002 | Greenberger | 708/622 |
| 7,287,051 | B1 | * | 10/2007 | Langhammer | 708/490 |

* cited by examiner

*Primary Examiner* — Michael D Yaary
(74) *Attorney, Agent, or Firm* — T. Lester Wallace; Kim-Wah Tong (57) ABSTRACT

A configurable multiplier circuit for multiplying both real and complex numbers is included in a PLD. In one embodiment, the circuit includes two adder trees. Multiplexers are used such that a conventional multiplier component is not required. The circuit is programmable to operate in one of two modes. In a first mode, the circuit multiplies the four parts of two complex numbers and outputs two values, the real portion of the product and the imaginary portion of the product. In a second mode, each of two portions of the circuit multiplies two pairs of real numbers and outputs the products.

8 Claims, 8 Drawing Sheets

| MULTIPLEXER NUMBER | CONTENT OF CONFIGURATION BIT | |
|---|---|---|
| | FIRST MODE: COMPLEX MULTIPLICATION | SECOND MODE: REAL MULTIPLICATION |
| 55 | 1 | 0 |
| 56 | 1 | 0 |
| 57 | 1 | 0 |
| 58 | 0 | 0 |
| 59 | 1 | 1 |
| 60 | 0 | 1 |
| 61 | 0 | 0 |
| 62 | 1 | 0 |
| 63 | 1 | 0 |
| 64 | 1 | 0 |
| 65 | 0 | 1 |
| 66 | 1 | 1 |

FIG. 5

| INPUT OR OUTPUT | 17 | 18 | 19 | 20 | 21 | 22 | 23 | 24 | 25 | 26 |
|---|---|---|---|---|---|---|---|---|---|---|
| VALUE ON INPUT OR OUTPUT | | | | | | | | | | |
| FIRST MODE: COMPLEX MULTIPLICATION | $X_{RE}$ | $X_{IM}$ | $Y_{RE}$ | $Y_{IM}$ | NO INPUT | NO INPUT | NO INPUT | NO INPUT | $P_{RE}$ | $P_{IM}$ |
| SECOND MODE: REAL MULTIPLICATION | A | B | C | D | E | F | G | H | CP1 | CP2 |

FIRST MODE

MULTIPLICAND     MULTIPLIER $(X_{RE} + iX_{IM}) \times (Y_{RE} + iY_{IM})$ $X_{RE}Y_{RE} + iX_{RE}Y_{IM} + iX_{IM}Y_{RE} - X_{IM}Y_{IM}$ $(X_{RE}Y_{RE} - X_{IM}Y_{IM}) + i(X_{RE}Y_{IM} + Y_{RE}X_{IM})$ $P_{RE} + iP_{IM}$

FIG. 8

| $Y_{REi}$ | $Y_{IMi}$ | FIRST PORTION $(X_{RE}Y_{REi} - X_{IM}Y_{IMi})$ | SECOND PORTION $(X_{RE}Y_{IMi} + X_{IM}Y_{REi})$ |
|---|---|---|---|
| 0 | 0 | 0 | 0 |
| 1 | 0 | $X_{RE}$ | $X_{IM}$ |
| 0 | 1 | $\overline{X_{IM}} + 1$ | $X_{RE}$ |
| 1 | 1 | $X_{RE} + \overline{X_{IM}} + 1$ | $X_{RE} + X_{IM}$ |

MULTIPLIER CIRCUIT CONFIGURABLE FOR REAL OR COMPLEX OPERATION

FIELD OF THE INVENTION

The present invention relates to programmable logic devices, and more particularly to circuits and methods for including a multiplier circuit in an integrated circuit (IC).

BACKGROUND OF THE INVENTION

Programmable logic devices (PLDs), such as field-programmable gate arrays (FPGAs), are user-programmable integrated circuits that can be programmed to implement user-defined logic circuits. In a typical FPGA architecture (for example, a Virtex-II Pro FPGA available from Xilinx Inc. of San Jose Calif.), an array of configurable logic blocks (CLBs) and a programmable interconnect structure are surrounded by a ring of programmable input/output blocks (IOBs). The programmable interconnect structure comprises interconnects and configuration memory cells. Each of the CLBs and the IOBs also includes configuration memory cells. The contents of the configuration memory cells determine how the CLB, the programmable interconnect structure or the IOB is configured. Additional resources, such as multipliers, block random access memory and a microprocessor are also included on the FPGA for use in the user-defined circuit.

To realize a user-defined circuit, configuration data is loaded into the configuration memory cells such that the CLBs and IOBs are configured to emulate particular circuit components used in the user-defined circuit. Configuration data is also loaded into the configuration memory cells of the programmable interconnect structure such that the programmable interconnect structure connects the various configured CLBs and IOBs in a desired manner to realize the user-defined circuit.

There is a market demand for PLDs to perform ever more complex tasks, such as the multiplication of complex numbers. To efficiently multiply complex numbers, dedicated multiplier resources for handling complex numbers could be provided on an FPGA. One application for the multiplication of complex numbers would be in digital signal processing. Where a digitized complex data stream is supplied to one input of a mixer, and where a complex data stream representing the local oscillator frequency is supplied to the other input of the mixer, complex number multiplication can be used to calculate the complex output of the mixer.

One conventional way to multiply complex numbers involves real number multiplier components. Each multiplier component outputs the cross product of two inputs. Multiplier components are used to calculate the cross products that make up the arithmetic solution to the multiplication of two complex numbers. The product of a first complex number $X_{RE}+iX_{IM}$ times a second complex number $Y_{RE}+iY_{IM}$ can be expressed in terms of four cross products $X_{RE}Y_{RE}$, $X_{IM}Y_{IM}$, $X_{RE}Y_{IM}$, and $Y_{RE}X_{IM}$, where $(X_{RE}Y_{RE}-X_{IM}Y_{IM})$ is the real part of the product and $(X_{RE}Y_{IM}+Y_{RE}X_{IM})$ is the imaginary part of the product. Thus, one multiplier component is used to calculate each of the four cross products. A total of four multiplier components are used. An adder and a subtractor are typically required to combine the cross products to yield the complex solution.

Figure 1:
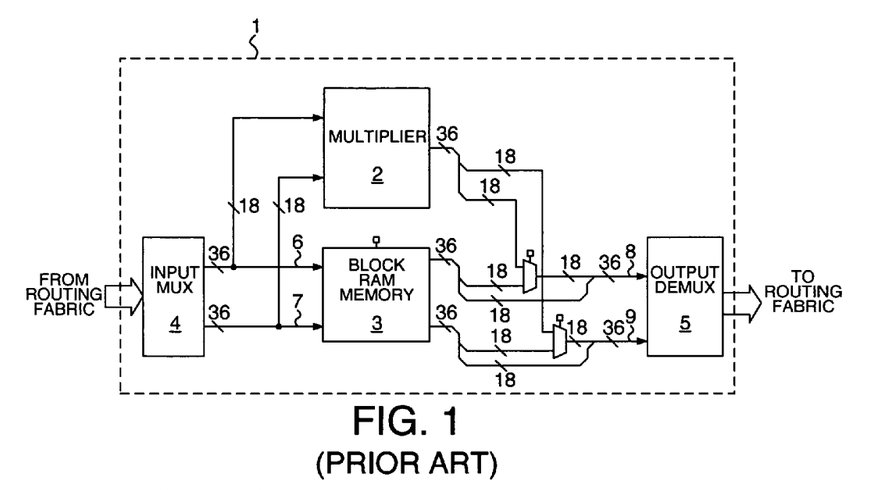
FIG. 1 (Prior Art) is a simplified diagram illustrating a multiplier component that shares interconnects with an adjacent block RAM.

FIG. 1 (Prior Art) shows a multiplier component 1 within an FPGA as used in one conventional multiplication method. Multiplier component 1 includes a multiplier 2, a dual-ported block RAM 3, an input multiplexer 4 and an output demultiplexer 5. dual-ported block RAM 3 is coupled to input multiplexer 4 by two 36-bit input buses 6 and 7. Output demultiplexer 5 receives data from dual-ported block RAM 3 on two 36-bit output buses 8 and 9. In order to conserve integrated circuit area, input buses 6 and 7 are shared and are also used to supply input values to multiplier 2. Similarly, output buses 8 and 9 can be used to receive output values from multiplier 2. Accordingly, when multiplier component 1 is in operation, access to block RAM 2 is restricted by the number of bits of input buses 6 and 7 used to provide data to multiplier 2. A set of memory cells configures the width of block RAM 3. Block RAM 3 can be set to output words of width N, where N equals 1, 2, 4, 9, 18 or 36. When N is 36, multiplier 2 is not used.

Figure 2:
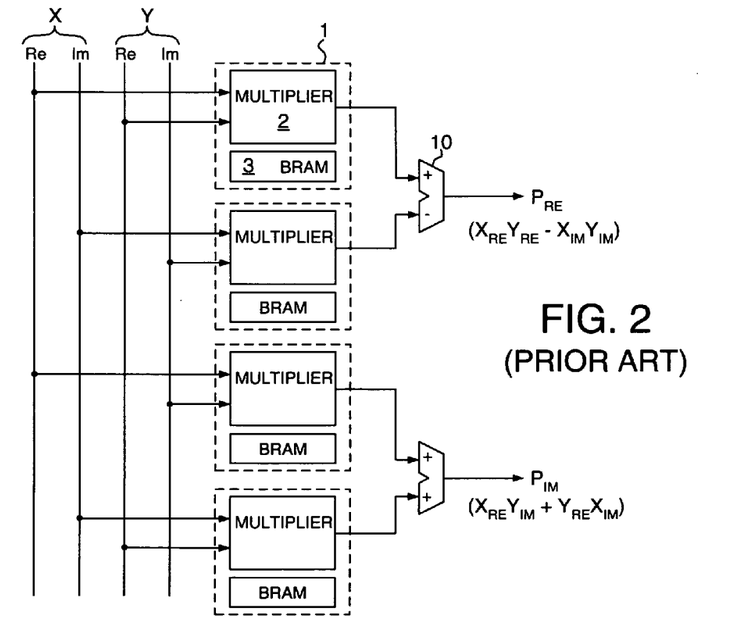
FIG. 2 (Prior Art) shows four multiplier components of an FPGA that are used to perform complex multiplication.

FIG. 2 (Prior Art) illustrates how four multipliers from four multiplier components are used to perform complex multiplication employing conventional techniques. Each complex number to be multiplied has a real part and an imaginary part. Four multipliers are required to calculate the four cross products of the solution.

The difference of two cross products is calculated by subtractor 10 to obtain the real part of the solution $(X_{RE}Y_{RE}-X_{IM}Y_{IM})$, and the other two cross products are added by an adder to obtain the imaginary part of the solution $(X_{RE}Y_{IM}+Y_{RE}X_{IM})$. The adders are implemented in the CLBs. Memory in four RAM blocks is restricted because four multiplier components with shared interconnects are used.

The above-described problem of restricting access to block RAM might be solved by providing additional dedicated interconnects. Providing additional dedicated interconnects, however, may make the structure larger, thereby increasing production cost. The resulting FPGA would be less desirable, especially for applications that do not require complex multiplication.

A second conventional way to multiply complex numbers involves expressing the arithmetic solution in terms of $(X_{RE}-X_{IM})Y_{IM}$, thereby reducing to three the number of cross products in the solution. This way reduces to three the number of multiplier components used in the multiplier circuit to calculate the solution. Again, an adder and a subtractor are typically required to combine the cross products to yield the complex solution. Moreover, in this second conventional method, addition is performed both before and after the multiplication, thereby increasing the time for computation.

Thus an improved way of multiplying complex numbers that reduces the number of multiplier components is sought. A circuit and method for including a multiplier resource in a PLD is sought that increases the availability of block RAM through existing interconnects when the multiplier is performing complex multiplication and that reduces the number of multiplier components used to perform complex multiplication.

SUMMARY OF THE INVENTION

In a first embodiment, a configurable multiplier circuit for use in a programmable logic device performs complex multiplication. The configurable multiplier circuit includes a first circuit portion and a second circuit portion. Each of the first and second circuit portions has a plurality of inputs for receiving input values and an output for outputting an output product value.

When performing complex multiplication, dedicated local connections between the first and second circuit portions allow each circuit portion access to values present on inputs of the other circuit portion. This reduces to eight the total number of interconnects in use when the composite configurable multiplier circuit is performing complex multiplication. Use of these interconnects may be shared by the configurable multiplier circuit and an adjacent circuit such as a block RAM. By reducing the number of interconnects used by the multiplier circuit, accessibility across the multiplier circuit through the shared interconnects and to the adjacent circuit is improved.

In a second embodiment, a configurable multiplier circuit is configurable to operate in either a first mode or a second mode. The configurable multiplier circuit does not include a conventional multiplier component. Rather, each of the first and second circuit portions includes a series of multiplexers and a single adder tree.

In the first mode, the circuit multiplies two complex numbers, each number having a real part and an imaginary part. In one example, the circuit receives four values on four of its eight inputs. Four inputs of the eight inputs are not used. The circuit outputs the two parts of the resulting product, the real portion of the product and the imaginary portion of the product.

In the second mode, each of the two circuit portions multiplies two pairs of real numbers and outputs the sum of the resulting two cross products. Accordingly, the configurable multiplier circuit is versatile and sees special applicability in FPGA's in that the circuit is usable to perform real multiplication when complex multiplication is not needed.

Additional novel aspects and embodiments are described in the detailed description below. The claims, and not this summary, define the scope of the invention.

BRIEF DESCRIPTION OF THE DRAWINGS

The accompanying drawings, where like numerals indicate like components, illustrate embodiments of the invention.

DETAILED DESCRIPTION OF THE DRAWINGS

In an exemplary embodiment of the present invention distributed arithmetic principles are used to reduce the multiplier circuitry needed to compute the real part and the imaginary part of a complex multiply. The result is rather than two conventional multiplier circuits followed by a subtractor circuit to compute the real part and two conventional multiplier circuits followed by an adder circuit to compute the imaginary part, there are a first programmable (i.e., configurable) multiplier circuit to compute the real part and a second programmable (i.e., configurable) multiplier circuit to compute the imaginary part. In addition by reprogramming (i.e., reconfiguring) the first and second programmable multiplier circuits, two real number multiplies can be done concurrently.

Figure 3A:
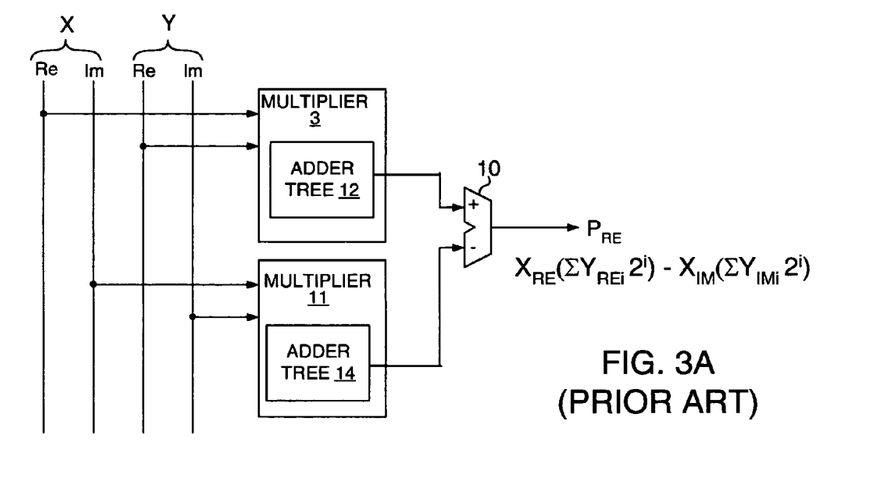
FIG. 3A is a simplified block diagram of a prior art circuit that computes the real part of the complex multiply shown in FIG. 2.

FIG. 3A is a simplified block diagram of a prior art circuit that computes the real part, $P_{RE}$, of the complex multiply shown in FIG. 2. Let $X_{RE}$, $Y_{RE}$, $X_{IM}$, and $Y_{IM}$ be binary numbers. Let $Y_{REi}$ and $Y_{IMi}$ be the $2^i$ bit in $Y_{RE}$ and $Y_{IM}$, respectively. Thus:

$$P_{RE} = (X_{RE}*Y_{RE} - X_{IM}*Y_{IM}) = (X_{RE}(\Sigma Y_{REi}2^i) - X_{IM}(\Sigma Y_{IMi}2^i))$$ [eqn 1]

This means that the multiplier 3 creates multiple partial products which are then added together by adder tree 12 to produce $X_{RE}(\Sigma Y_{REi}2^i)$ in a way similar to normal multiplication of two real base 10 numbers. Like wise the multiplier 11 creates multiple partial products which are then added together by adder tree 14 to produce $X_{IM}(\Sigma Y_{IMi}2^i)$. The second result $X_{IM}(\Sigma Y_{IMi}2^i)$ is subtracted from the first result $X_{RE}(\Sigma Y_{REi}2^i)$ in adder 10 to give $P_{RE}$.

By applying the principles of distributed arithmetic equation 1 can be re-written to:

$$P_{RE} = \left(X_{RE}\left(\sum Y_{REi}2^i\right) - X_{IM}\left(\sum Y_{IMi}2^i\right)\right)$$ [eqn 1]

$$= \left(\left(\sum Y_{REi}X_{RE}2^i\right) - \left(\sum Y_{IMi}X_{IM}2^i\right)\right)$$ [eqn 2]

$$= \sum (Y_{REi}X_{RE} - Y_{IMi}X_{IM})2^i$$ [eqn 3]

The term in parenthesis, i.e., $(Y_{REi}X_{RE} - Y_{IMi}X_{IM})$ of equation 3 can be evaluated using table 1 below, which can, in one embodiment, be implemented by a multiplexer with inputs: 0, $X_{RE}$, $-X_{IM}$, and $(X_{RE}-X_{IM})$ and selector bits $Y_{REi}$ and $Y_{IMi}$;

TABLE 1

| $Y_{REi}$ | $Y_{IMi}$ | $X_{RE} * Y_{REi} - X_{IM} * Y_{IMi}$ |
|---|---|---|
| 0 | 0 | 0 |
| 1 | 0 | $X_{RE}$ |
| 0 | 1 | $-X_{IM}$ |
| 1 | 1 | $X_{RE} - X_{IM}$ |

Figure 3B:
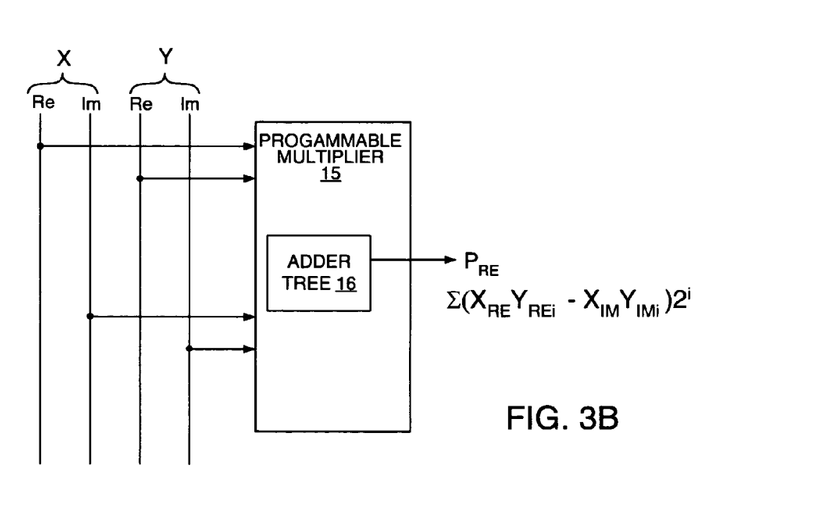
FIG. 3B is an example of a programmable multiplier of an embodiment of the present invention.

FIG. 3B is an example of a programmable multiplier 15 of an embodiment of the present invention. Programmable multiplier 15 calculates $P_{RE}$ of equation 3 by using only one adder tree 16. The terms $(Y_{REi}X_{RE}-Y_{IMi}X_{IM})$ are calculated using table 1 above. Thus in comparing FIG. 3A of the prior art and FIG. 3B of an embodiment of the present invention, there is at least one less adder tree. The discussion of the second programmable multiplier (not shown) for the imaginary portion $(P_{IM})$ is similar to the above and has been omitted so as not to obscure the invention. In any case the second programmable multiplier also saves at least one adder tree over the prior art.

Figure 4:
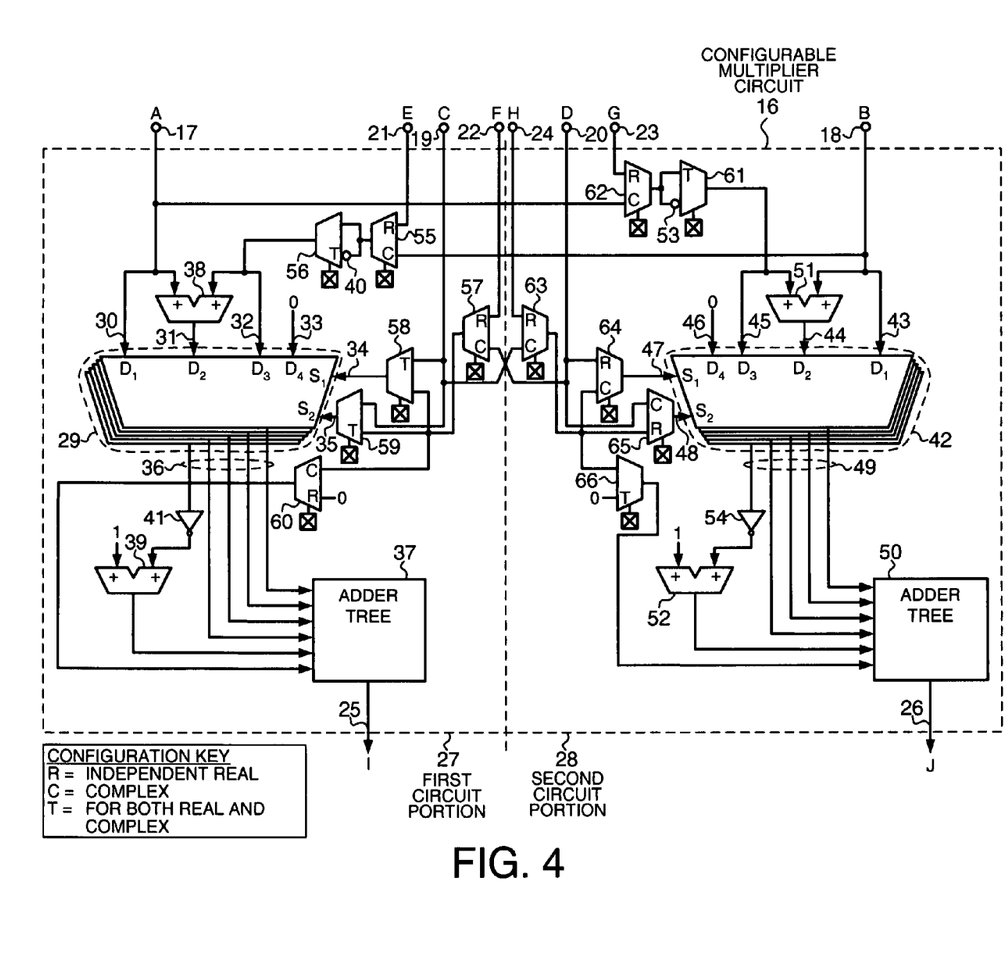
FIG. 4 is a schematic diagram of a configurable multiplier circuit for multiplying both real and complex numbers.

FIG. 4 shows configurable (i.e., programmable) multiplier circuit 16 in more detail. For clarity, the block RAM portion of multiplier circuit 16 is not shown. The values to be multiplied by circuit 16 are received on eight multi-bit input leads 17-24. Circuit 16 outputs the result of its multiplication operation onto two outputs 25 and 26. Circuit 16 is divided into a first circuit portion 27 and a second circuit portion 28.

First circuit portion 27 contains a series of multiplexers 29. Each of the multiplexers within the series of multiplexers 29 has four data inputs 30-33, two select inputs 34 and 35 and a multiplexer output 36. For input values on inputs 17-24 that are N digits wide, there are N multiplexers in the series of multiplexers 29, each controlled by one bit of the multi-lead output of a multiplexer 58 and the corresponding output of a multiplexer 59. Each multiplexer 29 comprises N+1 single-bit multiplexers sharing the same control bits. The first circuit portion 27 also contains an adder tree 37, a first adder 38, a second adder 39 and multi-lead inverters 40 and 41.

Second circuit portion 28 contains a series of multiplexers 42, each with four data inputs 43-46, two select inputs 47 and 48 and a multiplexer output 49. For input values of inputs 17-24 that are N digits wide, there are N multiplexers in the series of multiplexers 42, each controlled by one bit of the multi-lead output of a multiplexer 64 and the corresponding output of a multiplexer 65. Each multiplexer 42 comprises N+1 single-bit multiplexers sharing the same control bits. The second circuit portion 28 also contains an adder tree 50, a first adder 51, a second adder 52 and multi-lead inverters 53 and 54.

Configurable multiplier circuit 16 is configurable to operate in a first mode and a second mode, the first mode corresponding to complex multiplication and the second mode corresponding to real multiplication. The configuration is accomplished by setting a configuration bit in each configuration memory cell of each of twelve configuration multiplexers 55-66.

Figure 5:
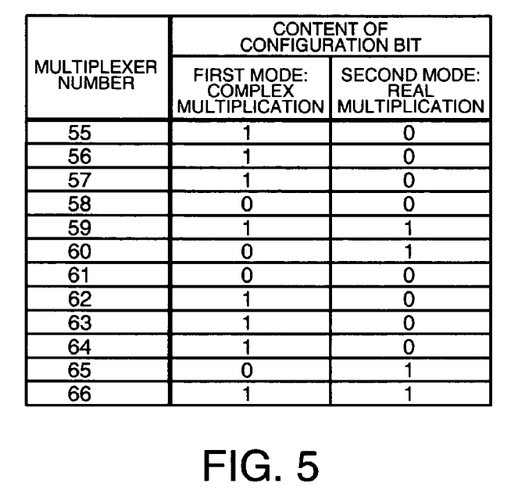
FIG. 5 is a table showing the configuration bits that configure configuration multiplexers in a first mode and in a second mode.

FIG. 5 is a table showing how each of the twelve configuration multiplexers 55-66 is configured in order to place the configurable multiplier circuit 16 into the first mode and into the second mode. When a configuration bit is a zero, the associated configuration multiplexer selects the top data input as oriented in FIG. 4. When the configuration bit is a one, the associated configuration multiplexer selects the bottom data input. The configuration bit of the configuration multiplexers are loaded in the same fashion as are other configuration bits found in other portions of a FPGA. Each configuration memory cell is represented in FIG. 4 by a crossed box below its associated configuration multiplexer.

In FIG. 4, the configuration of each configuration multiplexer is represented by the letters C, R and T adjacent to each multiplexer data input. The value on an input with an adjacent C is output from the multiplexer in the first mode. The value on an input with an adjacent R is output in the second mode. And the value on an input with an adjacent T is output in both modes. Each of the configuration multiplexers 56, 58, 59, 61 and 66 contains a T and is redundant because the same T input is chosen in both modes. Redundant multiplexers 56, 58, 59, 61 and 66 are included in the configurable multiplier circuit 16 so that first circuit portion 27 is a mirror image of second circuit portion 28. First circuit portion 27 is thus logically identical to second circuit portion 28 and increases homogeneity in the FPGA.

In another embodiment of a multiplier circuit in which the two circuit portions are not logically identical, configuration multiplexers 56, 58, 59, 61 and 66 are replaced by the input that is always chosen. Inverter 40 is realized as a stand-alone multi-lead inverter. Inverter 53, on the other hand, is not used and therefore is omitted.

In the first mode, configurable multiplier circuit 16 calculates the product of one operand pair. The operand pair consists of two complex numbers (a first multiplicand and a first multiplier). Configurable multiplier circuit 16 outputs the solution as a real product and an imaginary product. The real product is calculated in first circuit portion 27 and output on output 25. The imaginary product is calculated in second circuit portion 28 and output on output 26.

In the second mode, circuit portions 27 and 28 operate independently of one another. First circuit portion 27 calculates the products of two operand pairs consisting of real numbers and outputs the sum of the two products. Second circuit portion 28 calculates the products of another two operand pairs and outputs the sum of the two products.

Figure 6:
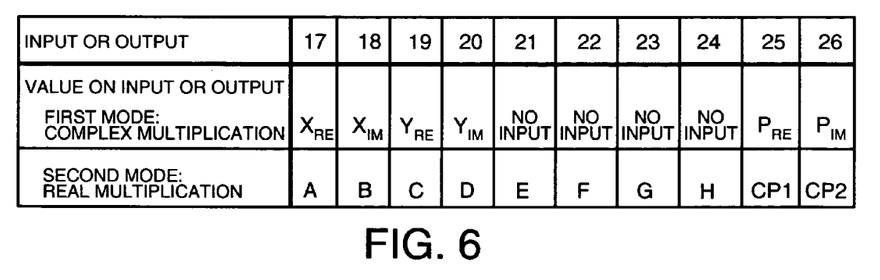
FIG. 6 is a table showing sample values for the inputs and outputs of the circuit of FIG. 4 in a first mode and in a second mode.
Figure 7A:
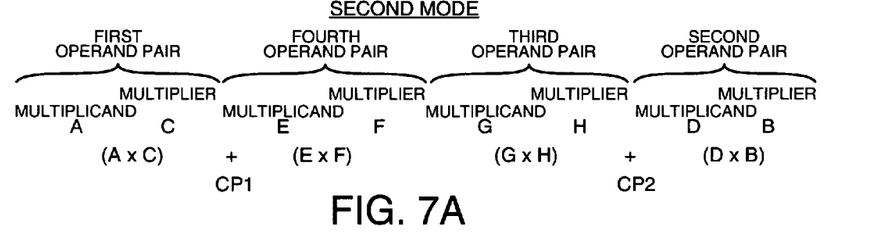
FIG. 7 shows mathematical equations for the real multiplication performed by the circuit of FIG. 4 in the second mode.

FIG. 6 shows values on the inputs and outputs of circuit 16 in each mode. The bottom row of FIG. 6 sets forth an example of values used in the second mode. In the second mode, first circuit portion 27 multiplies a first operand pair and a fourth operand pair and adds the resulting two products. The first operand pair consists of a multiplicand A and a multiplier C. The fourth operand pair consists of a multiplicand E and a multiplier F. Where the values A, E, C and F are present on the inputs 17, 21, 19 and 22, respectively, the value on output 25 is CP1. As shown in FIG. 7A, CP1 equals the sum of the two cross products A×C and E×F.

In the second mode, the second circuit portion 28 independently multiplies a second operand pair and a third operand pair and adds the resulting two products. The second operand pair consists of a multiplicand D and a multiplier B. The third operand pair consists of a multiplicand G and a multiplier H. Where the values B, G, D and H are present on the inputs 18, 23, 20 and 24, respectively, the value on output 26 is CP2. As shown in FIG. 7A, CP2 equals the sum of the two cross products G×H and D×B.

In an alternative embodiment of configurable multiplier circuit 16, inputs 21, 22, 23 and 24 are coupled to ground within configurable multiplier circuit 16. The values of E, F, G and H on input leads 21, 22, 23 and 24 are held at arithmetic zero. Thus, in this embodiment, configurable multiplier circuit 16 has only four input leads 17 (A), 19 (C), 20 (D) and 18 (B), the same number of input leads as present on two multiplier components of the prior art as shown in FIG. 2. The two real products being A×C and B×D.

Figure 8:
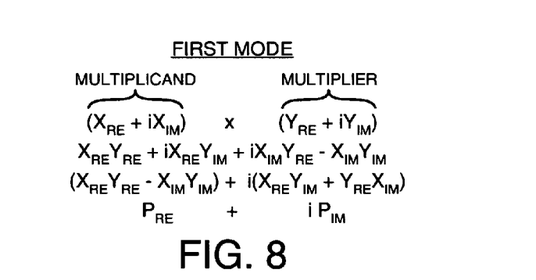
FIG. 8 shows mathematical equations for the complex multiplication performed by the circuit of FIG. 4 in the first mode.

Whereas four multiplier components of the prior art are used to multiply a complex operand pair, configurable multiplier circuit 16 alone can multiply a complex operand pair in the first mode, as illustrated in FIG. 8. The sharing of data on input leads 17, 19, 20 and 18 between first circuit portion 27 and second circuit portion 28 allows configurable multiplier circuit 16 to perform complex multiplication using only two programmable (i.e., configurable) multipliers. The cross connections between first circuit portion 27 and second circuit portion 28 shown in FIG. 4 allow the data on input leads 17, 19, 20 and 18 to be shared.

Figure 7B:
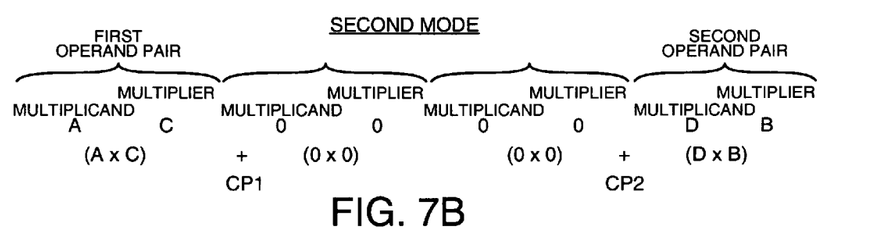

FIG. 7B illustrates real multiplication that also can be performed by the alternative embodiment of configurable multiplier circuit 16. The alternative embodiment of configurable multiplier circuit 16 can multiply two real operand pairs in the second mode. The cross connections between first circuit portion 27 and second circuit portion 28 are not used for real multiplication. Configurable multiplier circuit 16 multiplies only two operand pairs and outputs two products. First circuit portion 27 multiplies the first operand pair, and second circuit portion 28 multiplies the second operand pair. The first operand pair consists of multiplicand A and multiplier C, and the second operand pair consists of multiplicand D and multiplier B. Where the values A, C, D and B are present on the inputs 17, 19, 20 and 18, respectively, the value CP1 on output 25 is the product A×C, and the value CP2 on output 26 is the product D×B.

FIG. 6 also shows an example of values on the inputs and outputs of circuit 16 in the first mode, where both first circuit portion 27 and second circuit portion 28 are used to multiply a first multiplicand times a first multiplier. The first multiplicand is a complex number composed of a real part $X_{RE}$ and an imaginary part $X_{IM}$. The first multiplier is a complex number composed of a real part $Y_{RE}$ and an imaginary part $Y_{IM}$. Where the values $X_{RE}$, $X_{IM}$, $Y_{RE}$ and $Y_{IM}$ are present on the inputs 17, 18, 19 and 20, respectively, the value on output 25 is $P_{RE}$, and the value on output 26 is $P_{IM}$. Inputs 21-24 are not used in the first mode. As shown in FIG. 8, $P_{RE}$ is the real part of the product of the first multiplicand times the first multiplier, and $P_{IM}$ is the imaginary part of the product of the first multiplicand times the first multiplier. $P_{RE}$ equals the difference of two real cross products $X_{RE}Y_{RE} - X_{IM}Y_{IM}$, and $P_{IM}$ equals the sum of two imaginary cross products $X_{RE}Y_{IM} + Y_{RE}X_{IM}$.

Figure 9:
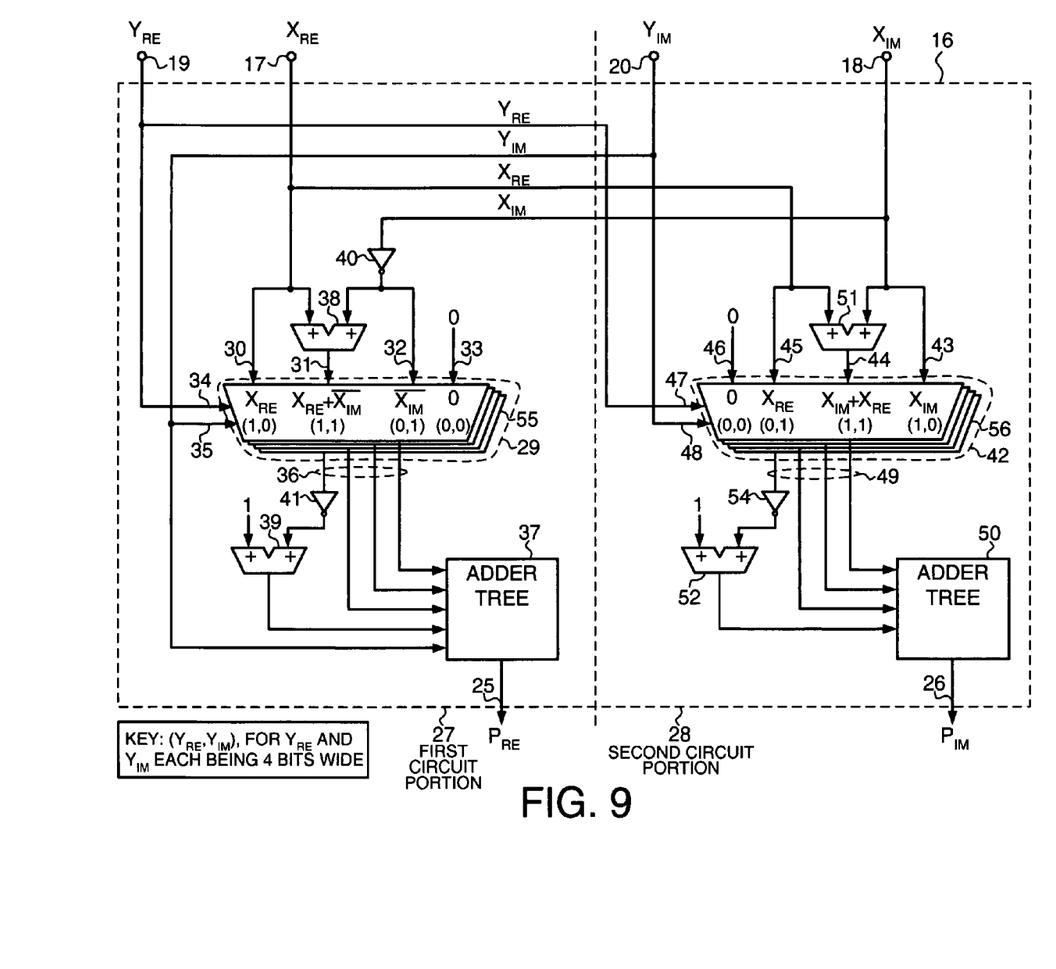
FIG. 9 is a simplified diagram the circuit of FIG. 4 configured into the first mode.

FIG. 9 is a simplified diagram of FIG. 4 showing how the configurable multiplier circuit 16 is configured in the first mode when the configuration bits of the configuration multipliers are set as illustrated in FIG. 5. Neither the configuration multiplexers 55-66, nor the unused inputs 21-24 are shown in FIG. 9. The inputs 17, 18, 19 and 20 with values $X_{RE}$, $X_{IM}$, $Y_{RE}$ and $Y_{IM}$ are coupled to the select inputs and data inputs of the two series of multiplexers 29 and 42. The values $X_{RE}$, $X_{IM}$, $Y_{RE}$ and $Y_{IM}$ are present on inputs 17, 18, 19 and 20, respectively, in two's complement form. The key at the lower left of FIG. 9 indicates which one of four possible combinations of multiplier bits selects which of the four data inputs of each multiplexer of multiplexer series 29 and multiplexer series 42. The first bit in the parenthesis comes from the real part $Y_{RE}$ of the multiplier, and the second bit comes from the imaginary part $Y_{IM}$.

On the first circuit portion 27, input 17 with value $X_{RE}$ is coupled to data input 30 of each multiplexer of multiplexer series 29. Where the values of the real and complex parts $X_{RE}$ and $X_{IM}$ of the multiplicand are M digits wide, sign-extended values with M+1 digits are supplied onto data input 30. Thus, input 17 is coupled to data input 30 through sign-extension circuitry. Input 17 is also coupled through sign-extension circuitry to a first input of first adder 38. Input 18 on second circuit portion 28 is coupled to inverter 40 on the first circuit portion 27. Although inverter 40 is represented here with a single inverter symbol, inverter 40 actually includes multiple inverters, one for each bit of the multi-bit value $X_{IM}$. The output of inverter 40 is coupled through sign-extension circuitry to a second input of first adder 38, as well as to data input 32 of each multiplexer of multiplexer series 29. The output of first adder 38 is coupled to data input 31 of each multiplexer of multiplexer series 29. A value of M+1 zeros is input onto data input 33 of each multiplexer of multiplexer series 29.

On the first circuit portion 27, each bit of value $Y_{RE}$ from input 19 is supplied to the select input 34 of a corresponding multiplexer in multiplexer series 29. Each bit of value $Y_{IM}$ from input 20 on the second portion 28 is supplied to the select input 35 of a corresponding multiplexer in multiplexer series 29 on the first portion 27. Where the values of the real and complex parts $Y_{RE}$ and $Y_{IM}$ of the multiplier are N digits wide, there are N multiplexers in the series of multiplexers 29. For example, in an embodiment where multiplier values $Y_{RE}$ and $Y_{IM}$ are each eighteen bits wide, each multiplexer in series 29 consists of eighteen four-input multiplexers. In FIG. 9, multiplexer series 29 contains four multiplexers, which would correspond to four-bit-wide input values on input 19 and input 20.

Successive bits of the multiplier values $Y_{RE}$ and $Y_{IM}$ are supplied onto select inputs 34 and 35, respectively, and are used to select one of the four values of the data inputs 30-33, which are derived from the real and imaginary parts of the multiplicand. The least significant bit of each value $Y_{RE}$ and $Y_{IM}$ is supplied onto the select inputs of the first multiplexer of multiplexer series 29. In parallel, the next bit of each value $Y_{RE}$ and $Y_{IM}$ is supplied onto the select inputs of the second multiplexer of multiplexer series 29, and so forth until the Nth bit of each value $Y_{RE}$ and $Y_{IM}$ is supplied onto the select inputs of the last multiplexer 55 of multiplexer series 29. Successive bits of the multiplier thereby multiply word-wide multiplicands having M+1 bits. The appropriate partial product of the real part $P_{RE}$ is selected for each successive bit of the multiplier and becomes the output of the corresponding multiplexer of multiplexer series 29. As illustrated, the output of each successive multiplexer is input as a successive corresponding operand of adder tree 37, where each successive operand proceeding in a downward fashion is shifted one bit to the left with respect to the operand above it.

After selecting the appropriate partial product for the sign bit of the multiplier parts $Y_{RE}$ and $Y_{IM}$, the output of the last multiplexer 55 of the multiplexer series 29 is coupled to the adder tree 37 through additional circuitry. The negative weighting of the sign bits of the two binary multipliers 34 and 35 or 47 and 48 can be accommodated by 2's complementing the output of the appropriate multiplexer. This is accomplished on the first circuit portion 27 by inverting the output of the last multiplexer 55 using inverter 41. A digital 1 is then added to the output of inverter 41 using a second adder 39. Where the sign bit of both multiplier parts $Y_{RE}$ and $Y_{IM}$, is positive, the output of multiplexer 55 is zero. In that case, inverter 41 together with second adder 39 produce the 2's complement of a binary zero of M+1 digits, which equals zero. The signed-2's complement of the output of the last multiplexer 55 is then input into a left-aligned input of adder tree 37.

As shown in FIG. 8, a real part of the product requires subtracting one cross product from another. The subtraction can be accomplished by complementing the value $X_{IM}$ prior to use in the first multiplexer series 29. A 1's complement is formed by inverting all digits of the value $X_{IM}$ in the inverter 40. Then in all cases where the 1's complement of $X_{IM}$ appears in the output of a multiplexer of multiplexer series 29, a digital one is added in the adder tree 37 with a weigh equal to the least significant bit of the corresponding multiplexer.

Figure 10:
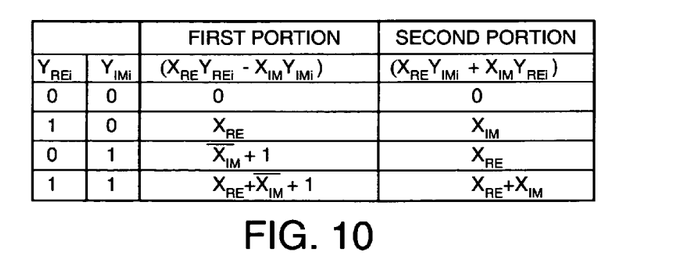
FIG. 10 is table showing the values of the outputs in the first mode of a series of multiplexers on a first circuit portion and of a series of multiplexers on a second circuit portion.

FIG. 10 is a table showing the values of the real part $P_{RE}$ and the imaginary part $P_{IM}$ of the partial products of the first multiplicand times the first multiplier for the four possible combinations of bits from $Y_{RE}$ and $Y_{IM}$ on the select inputs 34-35 of multiplexer series 29. FIG. 10 shows, for the first circuit portion 27, that $X_{IM}$ appears in a multiplexer output whenever the corresponding bit of $Y_{IM}$ is a one. In adder tree 37, the weight of the least significant bit of a multiplexer output is equal to the weight of the bit of $Y_{IM}$ corresponding to that multiplexer. Hence, the set of ones that must be added versus the ones in $Y_{IM}$ will have the same weight as in $Y_{IM}$. Thus, adding $Y_{IM}$ is the equivalent of adding these ones.

As shown in FIG. 9, the value $Y_{RE}$ from input 19 on the first portion 27 is supplied to the select input 47 of multiplexers in multiplexer series 42 on the second portion 28. The value $Y_{IM}$ from input 20 on the second portion 28 is supplied to the select input 48 of multiplexers in multiplexer series 42. Where the values of the real and complex parts $Y_{RE}$ and $Y_{IM}$ of the multiplier are N digits wide, there are N multiplexers in the multiplexer series 42.

Successive bits of the multiplier values $Y_{RE}$ (i.e., $Y_{RE\_i}$) and $Y_{IM}$ (i.e., $Y_{IM\_i}$) are input into the select inputs 47 and 48, respectively, and are used to select one of the four values on the data inputs 43-46, in a fashion similar to that performed in the first circuit portion 27. As with the first circuit portion 27, input values and their sums are sign extended by one digit before being input onto the data inputs 43-46 of multiplexer series 42.

As shown in FIG. 8, calculating the imaginary part $P_{IM}$ does not require subtraction of cross products. Therefore, no inverter is included between the input 18 and the multiplexer series 42 to perform a 1's complement. For the same reason, the value of $Y_{IM}$ on input 20 is not supplied to adder tree 50.

In a fashion similar to that performed in the first circuit portion 27, the appropriate partial products are selected for successive bits of the multipliers and becomes the output of the corresponding multiplexer of multiplexer series 42. As illustrated, the output of each successive multiplexer is input into a successive corresponding input of adder tree 50, where each successive input proceeding in a downward fashion is shifted one bit to the left with respect to the input above it.

In a fashion similar to that performed in the first circuit portion 27, the output of the last multiplexer 56 of the multiplexer series 42 on the second circuit portion 28 is coupled to the adder tree 50 through additional circuitry. The additional circuitry includes inverter 54 and second adder 52 that together form 2's complement the output of the last multiplexer 55 when the sign bit of the multiplier is negative (the digit 1). Where the sign bit of both multiplier parts $Y_{RE}$ and $Y_{IM}$ is positive, the output of multiplexer 56 is zero. In that case, inverter 54 together with second adder 52 produce the 2's complement of a binary zero of M+1 digits, which equals zero. The 2's complement of the output of the last multiplexer 56 is then input into a left-aligned input of.

Figure 11A:
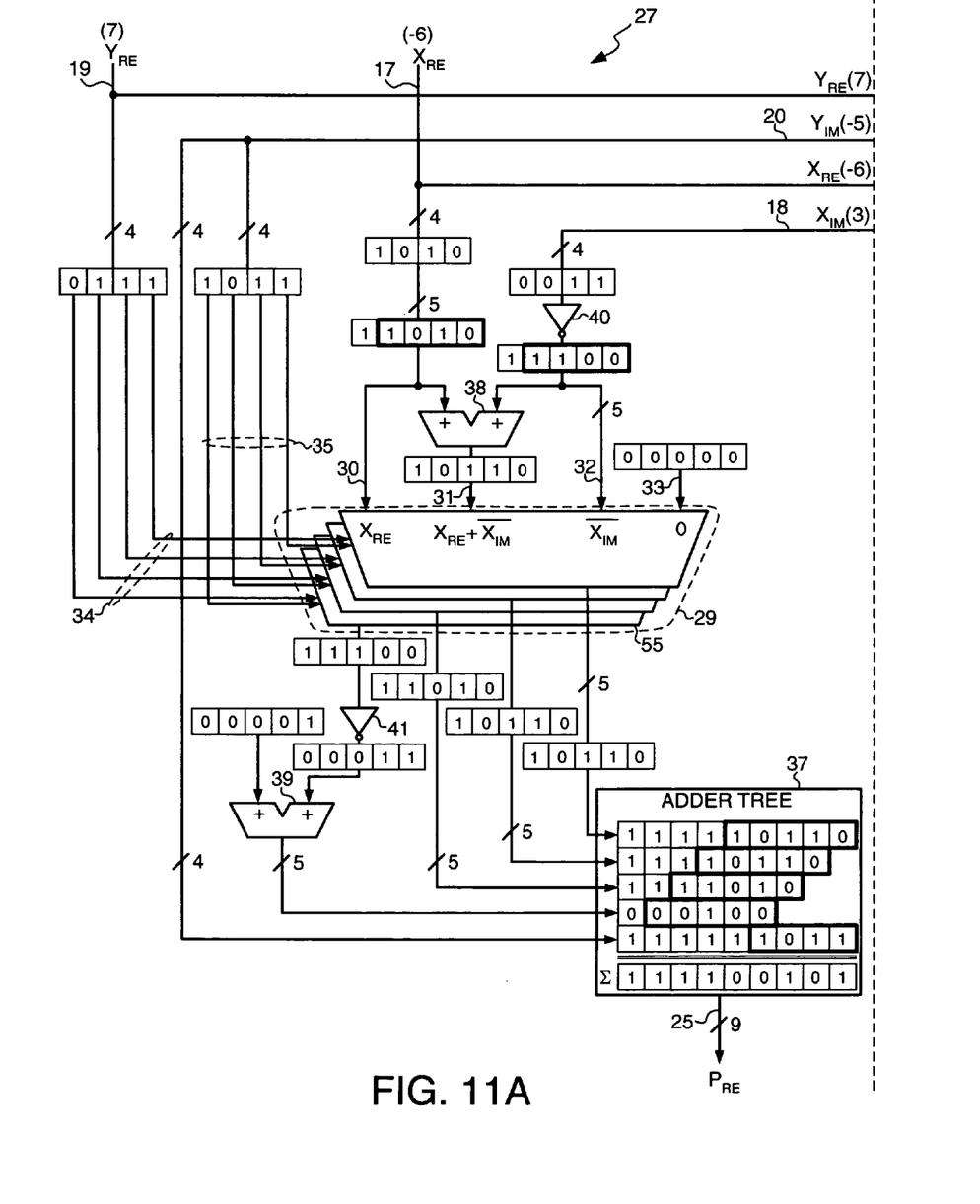
FIG. 11A is a simplified diagram of the first circuit portion showing a sample calculation in the first mode.
Figure 11B:
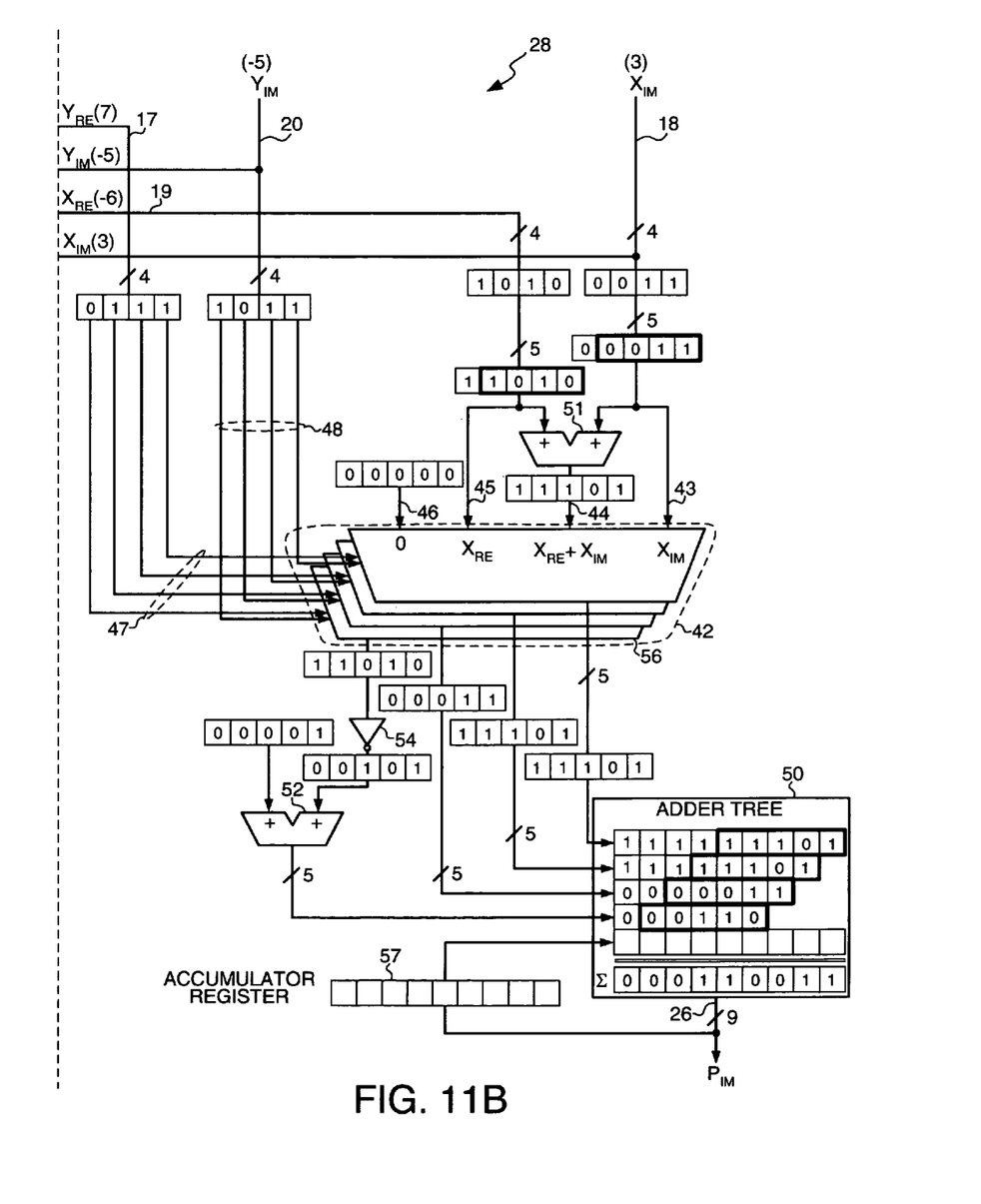
FIG. 11B is a simplified diagram of the second circuit portion showing a sample calculation in the first mode.

FIGS. 11A and 11B illustrate how configurable multiplier circuit 16 performs a sample calculation in the first mode. In the sample calculation, the multiplicand ($X_{RE}+iX_{IM}$) equals (−6+3i) and the multiplier ($Y_{RE}+iY_{IM}$) equals (7−5i). Each of the values $X_{RE}$, $X_{IM}$, $Y_{RE}$, and $Y_{IM}$ is a four-bit-wide word in signed magnitude representation. FIG. 11A shows the calculation performed on the first circuit portion 27 to compute output $P_{RE}$, the real part of the product of the multiplicand times the multiplier.

Sign extension circuitry (not shown) extends the length of the value $X_{RE}$ on input 17 from 1010, representing −6, to 11010, also representing −6. The five-bit-wide value of $X_{RE}$ is input into first adder 38 and onto data input 30 of multiplexer series 29. The inverter 40 receives the value $X_{IM}$ and inverts the value 0011, representing +3, to 1100. Sign extension circuitry (not shown) extends the value 1100 to 11100, which is input into first adder 38 and onto data input 32. A five-bit-wide digital zero is input onto data input 33. First adder 38 adds the value of $X_{RE}$ and the inverted value of value $X_{IM}$ and outputs the value 10110 onto data input 31 as shown.

The four-bit-wide values of $Y_{RE}$ and $Y_{IM}$ are input onto select input 34 and select input 35, respectively. The least significant bit of each value is input onto the select inputs of the first multiplexer of multiplexer series 29. The second least significant bit of each value of $Y_{RE}$ and $Y_{IM}$ is input onto the select inputs of the second multiplexer. The third least significant bit of each value is input onto a third multiplexer, and the sign bit of each value is input onto the last multiplexer 55 of multiplexer series 29. Each successive bit of the values $Y_{RE}$ and $Y_{IM}$ is input in parallel onto a different multiplexer. In the present example, the pairs of bits ($Y_{RE}$, $Y_{IM}$) that are input onto the first, second, third and last multiplexers are (1,1), (1,1), (1,0) and (0,1), respectively.

As shown in the table of FIG. 10, the select inputs (1,1) select the value $X_{RE}$ plus inverted $X_{IM}$ from data input 31. The select inputs (1,0) select the value $X_{RE}$ from data input 30.

The select inputs (0,1) coming from the sign bits of $Y_{RE}$ and $Y_{IM}$ select the value inverted $X_{IM}$ from data input 32. The value 11100 (inverted $X_{IM}$) selected by the sign bits of $Y_{RE}$ and $Y_{IM}$ is passed through inverter 41 and second adder 39 to form the 2's complement of 11100, which is 00100.

The outputs of successive multiplexers are coupled to successive inputs within adder tree 37 as shown. Each successive input of adder tree 37 is shifted one digit to the left with respect to the input above it. For example, the output of the second multiplexer is coupled to a second input of adder tree 37 that is shifted one digit to the left of a first input that is coupled to the output of the first multiplexer. The output of the last multiplexer 55 is coupled, through inverter 41 and second adder 39, to a fourth input of adder tree 37 that is shifted one digit to the left of a third input. In addition to the outputs of multiplexer series 29, the input 20 is also coupled to adder tree 37. The value $Y_{IM}$ is input into a final input of adder tree 37 that is right aligned as shown. Additional circuitry in adder tree 37 sign extends the values in all inputs so that the sum produced by adder tree 37 has nine digits. Adder tree 37 outputs $P_{RE}$, the real part of the product of the multiplicand times the multiplier. $P_{RE}$ equals $X_{RE}Y_{RE}-X_{IM}Y_{IM}$, which in the sample calculation is (−6)(+7)−(+3)(−5)=−27. The value on output 25 is the nine-digit value 111100101 in 2's complement representation, which equals −27.

FIG. 11B shows how second circuit portion 28 determines and outputs value $P_{IM}$ (the imaginary part of the product of the multiplicand times the multiplier). Second circuit portion 28 functions in a manner similar to first circuit portion 27, except that the value $Y_{IM}$ is not input into adder tree 50, and no input values are inverted before being input into first adder 51 and onto data inputs of multiplexer series 42. Sign extension circuitry (not shown) is also employed by second circuit portion 28 to produce five-bit-wide values to input onto the data inputs of adder 51 and multiplexer series 42.

Adder tree 50 outputs $P_{IM}$, which equals $X_{RE}Y_{IM}+Y_{RE}X_{IM}$. In the sample calculation $P_{IM}$ is (−6)(−5)+(+7)(+3)=+51. The value on output 26 is the nine-digit value 000110011 in 2's complement representation, which equals +51.

In the specific embodiment shown in FIG. 11B, the output 26 of adder tree 50 is coupled through an accumulator register 57 to a right-aligned input of adder tree 50. This allows multiple imaginary parts of products from the multiplication of multiple complex numbers to be added together. When an analogous accumulator register is combined with adder tree 37, configurable multiplier circuit 16 can multiply and accumulate multiple pairs of values $X_{RE}+jX_{IM}$ and $Y_{RE}+jY_{IM}$ in the first mode, as well as multiple operand pairs of values A and C, E and F, G and H and D and B in the second mode. As is known to one of ordinary skill in the art, the accumulator register and associated adder should be wider than the product.

While the present invention has been described in connection with specific embodiments for instructional purposes, the present invention is not limited thereto. For example, the configuration of configurable multiplier circuit 16 is accomplished by setting a configuration bit in a configuration memory cell on each of the configuration multiplexers 55-66. In another embodiment, the configuration is accomplished by connecting each configuration multiplexer to both a first voltage supply grid and a second voltage supply grid. A voltage on one grid configures the configurable multiplier circuit 16 for complex multiplication, and a voltage on the other grid configures the circuit for real multiplication. Various modifications, adaptations, and combinations of various features of the described embodiments can be practiced without departing from the scope of the invention as set forth in the claims.

What is claimed is:

1. A circuit, having inputs A, B, C, and, D, for multiplying a multiplicand by a multiplier, the circuit comprising:
   a first circuit portion, comprising:
      a first multiplexer having a first data input, a second data input, a third data input, a fourth data input, a first select input, a second select input, and a first multiplexer output, wherein A is present on the first data input, A plus a one's complement of B is present on the second data input, the one's complement of B is present on the third data input, and a value zero is present on the fourth data input; and
      a first adder tree having a first input, a second input, and an output, the first multiplexer output of the first circuit portion being coupled to the first input of the first adder tree, a difference of a product of A times C minus a product of B times D being output onto the output of the first adder tree; and
   a second circuit portion, comprising:
      a first multiplexer having a first data input, a second data input, a third data input, a fourth data input, a first select input, a second select input, and a first multiplexer output, wherein B is present on the first data input, B plus A is present on the second data input, A is present on the third data input, and the value zero is present on the fourth data input; and
      a second adder tree having a first input, a second input, and an output, the first multiplexer output of the second circuit portion being coupled to the first input of the second adder tree, a sum of a product of A times D plus a product of B times C being output onto the output of the second adder tree.

2. The circuit of claim 1, wherein A and C represent real values and B and D represent imaginary values, wherein the multiplier times the multiplicand equals a product, the product having a real part and an imaginary part, the real part being present on the output of the first adder tree of the first circuit portion, the imaginary part being present on the output of the second adder tree of the second circuit portion.

3. The circuit of claim 1, wherein each of C and D has N digits, where N is a first integer, the first circuit portion comprising N multiplexers one of which is the first multiplexer of the first circuit portion, the second circuit portion comprising N multiplexers, one of which is the first multiplexer of the second circuit portion, each of A and B having M digits, where M is a second integer, and each of the first data input, the second data input, the third data input, and the fourth data input of the N multiplexers of the first circuit portion is M+1 digits wide, and wherein each of the first data input, the second data input, the third data input, and the fourth data input of the N multiplexers of the second circuit portion is M+1 digits wide.

4. The circuit of claim 1, wherein each of A, B, C and D is a digital number in 2's complement representation.

5. The circuit of claim 1, the first circuit portion further comprising:
   a second multiplexer having a first data input, a second data input, a third data input, a fourth data input, a first select input, a second select input, and a data output, wherein A is present on the first data input, A plus a one's complement of B is present on the second data input, the one's complement of B is present on the third data input, and the value zero is present on the fourth data input, the data output of the second multiplexer of the first circuit portion being coupled to the second input of the first adder tree.

6. The circuit of claim 5, wherein C has a first bit and a second bit, wherein the first bit of C is supplied to one of the first select input or the second select input of the first multiplexer of the first circuit portion, and wherein the second bit of C is supplied to one of the first select input or the second select input of the second multiplexer of the first circuit portion.

7. The circuit of claim 1, wherein
   in a first mode, A and C represent real values, B and D represent imaginary values, the multiplicand times the multiplier equals a first product having a real part and an imaginary part, the real part being present on the output of the first adder tree, and the imaginary part being present on the output of the second adder tree, and
   in a second mode, the circuit multiplies four operand pairs to yield a first cross product A times C, a second cross product E times F, a third cross product G times H, and a fourth cross product D times B, wherein a first sum is present on the output of the first adder tree and a second sum is present on the output of the second adder tree, the first sum equaling the first cross product plus the second cross product and the second sum equaling the third cross product plus the fourth cross product.

8. The circuit of claim 7, wherein the first adder tree has a third input and wherein, in the first mode, D is present on the third input of the first adder tree.

* * * * *